United States Patent
Burke et al.

[11] Patent Number: 5,560,166
[45] Date of Patent: Oct. 1, 1996

[54] EXPANSION JOINT WITH PROTECTIVE SHIELDING

[75] Inventors: James Burke, Grand Junction, Colo.; F. Edward Linck, Kemah, Tex.

[73] Assignee: Foster Wheeler Energia Oy, Karhula, Finland

[21] Appl. No.: 118,389

[22] Filed: Sep. 7, 1993

Related U.S. Application Data

[63] Continuation-in-part of Ser. No. 773,217, Oct. 9, 1991, Pat. No. 5,383,316, which is a continuation-in-part of Ser. No. 697,111, May 8, 1991, which is a continuation-in-part of Ser. No. 598,250, Oct. 16, 1990, Pat. No. 5,311,715.

[51] Int. Cl.[6] .................................................. E04H 12/28
[52] U.S. Cl. ................... 52/218; 52/396.01; 52/396.04; 52/506.03
[58] Field of Search .......................... 52/218, 394, 302.3, 52/402, 393, 396.01, 396.04, 396.06, 506.02, 506.03, 506.04

[56] References Cited

U.S. PATENT DOCUMENTS

| | | | |
|---|---|---|---|
| 3,643,388 | 2/1972 | Parr et al. | 52/396.04 X |
| 4,481,746 | 11/1984 | Cimochowski | 52/506.02 X |
| 4,866,898 | 9/1989 | LaRoche et al. | |
| 5,263,293 | 11/1993 | Gohlke et al. | 52/396.01 |
| 5,269,110 | 12/1993 | Morrison et al. | 52/396.04 X |
| 5,311,715 | 5/1994 | Linck et al. | |
| 5,383,316 | 1/1995 | Burke et al. | |

*Primary Examiner*—Lanna Mai
*Attorney, Agent, or Firm*—Baker, Maxham, Jester & Meador

[57] ABSTRACT

An expansion joint for protectively shielding a seal member disposed in a joint between two flue sections, includes a first shield member having a foot for attachment to an end of a first flue section, the shield member having a curved panel portion for extending over and protectively shielding a seal member, and a second shield member having a foot for attachment to an end of a second flue section, the second shield member having a curved panel portion for extending over a portion of the first shield and along the direction of gas flow.

19 Claims, 4 Drawing Sheets

U.S. Patent    Oct. 1, 1996    Sheet 3 of 4    5,560,166
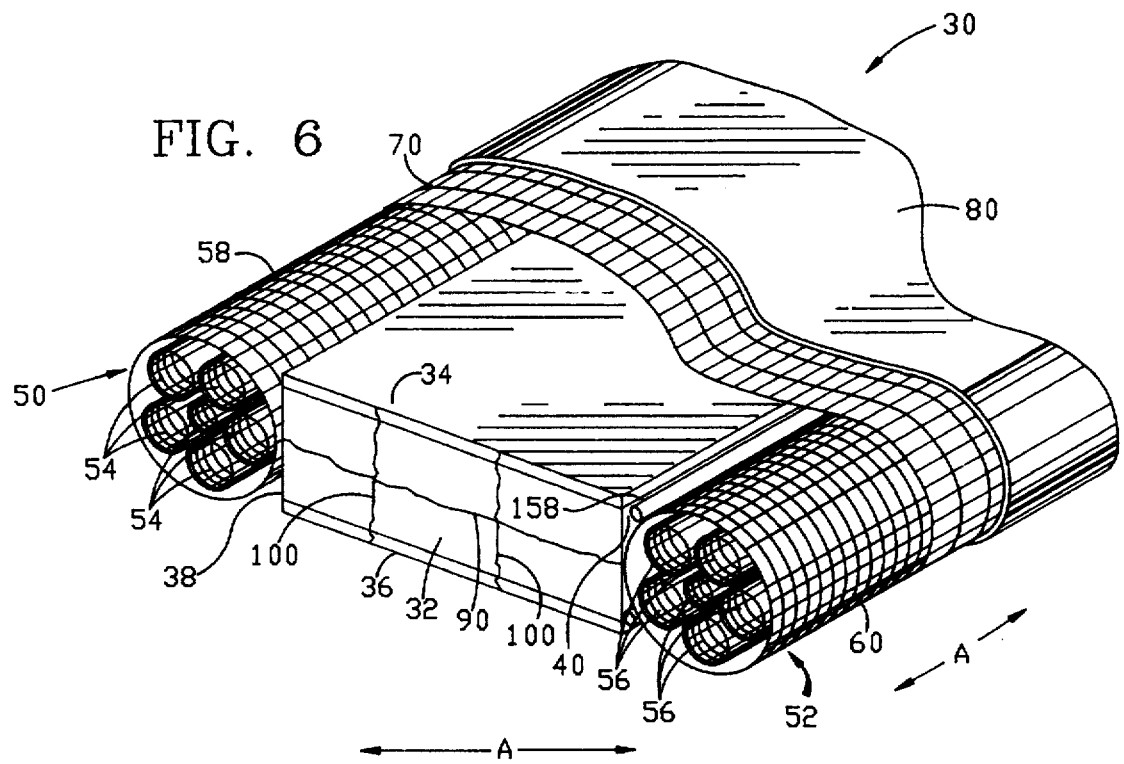
FIG. 6
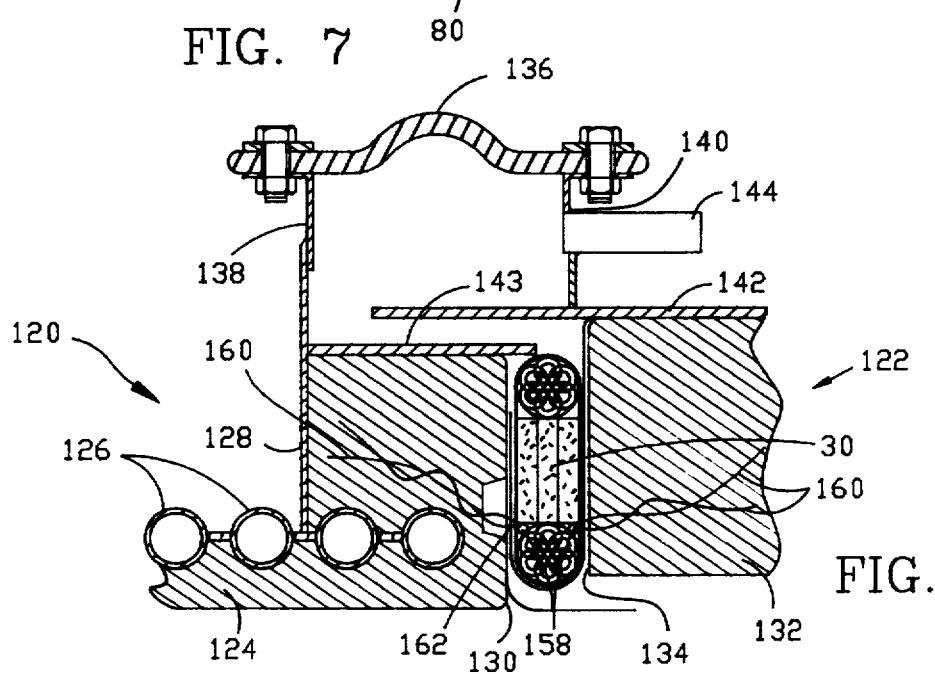
FIG. 7
FIG. 8

5,560,166

EXPANSION JOINT WITH PROTECTIVE SHIELDING

REFERENCE TO RELATED APPLICATIONS

The present application is a continuation-in-part of application Ser. No. 07/773,217, filed Oct. 9, 1991 now U.S. Pat. No. 5,383,316, which is a continuation-in-part of application Ser. No. 07/697,111, filed May 8, 1991, which is a continuation-in-part of application Ser. No. 07/598,250, filed Oct. 16, 1990 now U.S. Pat. No. 5,311,715.

BACKGROUND OF THE INVENTION

The present invention relates to expansion joints for flue systems and ducting and pertains particularly to improved non-metallic expansion joint for providing stress relief in refractory lined flue and ducting systems for high temperature applications such as power plants.

In power generating or cogeneration plants, including facilities for obtaining useable electrical power or processing steam/hot water from the burning of solid, liquid or gaseous fuel products, particulate matter such as sorbents and unburnt fuel is recirculated through the combustion. Hot flue gases generated by the combustion process are laden with ash and other particulate matters and are typically directed through a series of processing areas to remove particulates and environmentally hazardous components before finally being exhausted from the facility. FIG. 1 illustrates a power generation plant of unique design that includes a furnace having a circulating fluidized bed (CFB) wherein various fuel materials are combusted. The hot flue gases containing combustion by-products are transferred from the furnace through a flue duct/expansion joint to a cyclone separator.

The cyclone separator diverts heavier combustion particulate such as sorbents and unburnt fuel matter back to the CFB, through a loop seal assembly, which lifts the heavy particulates, mixes them with freshly fed fuel, and introduces the mixture to the combustion chamber. The fine particulate matter and hot flue gases are directed through a heat exchanger. The fine particulate matter is then diverted to a particulate filter for disposal. Gases emitted from the facility will have most of the combustion by-product emissions, including $NO_x$, $SO_2$, CO, particulates, etc., removed therefrom, resulting in an environmentally safe means of power generation.

Nonmetallic expansion joints are flexible connectors designed to provide stress relief in flue duct systems by absorbing differential movement caused by thermal changes. They also act as vibration isolators, and in some instances, make up for minor misalignment of adjoining flue ducts and/or equipment. They may be fabricated from a wide variety of nonmetallic materials, including synthetic elastomers, fabrics, insulation materials and other suitable materials depending upon the designs thereof. Since their introduction in the early 1960's, the use of nonmetallic expansion joints has continuously grown.

The advent of more rigid emission standards has caused the use of more complex flue work systems. Nonmetallic expansion joints have been used in place of the traditional all metal expansion joints to solve problems caused by the thermal and mechanical stresses generated in these complex systems. Although the major user of the nonmetallic joint continues to be the power generation industry, the use of this product has expanded into many other industries wherein gases are conveyed including pulp and paper plants, refineries, steel mills, foundries, smelters, cement plants, kilns, refuse incineration, marine applications, vapor-heat-dust recovery, food processing, and HVAC (Heating, Ventilating and Air Conditioning).

A typical prior art nonmetallic expansion joint is shown in FIG. 2. The joint includes a pair of angle brackets mounted to the respective ends of a pair of adjoining ducts or flues. A pair of frame members are in turn attached to the angle brackets. The frame members have mounted thereto a flexible pressure seal that extends around the periphery of the expansion joint. The pressure seal may be of the elastomeric type for operation below 400° F. or may be of the composite type for operation at temperatures continuously above 400° F. It will be appreciated that the flexible pressure seal allows relative axial, transverse, angular and rotational movement between the respective ducts while preventing the escape of pressurized flue gases and particulates carried therein. Other nonmetallic expansion joint constructions may be seen in the "Technical Handbook" published by the Ducting Systems Nonmetallic Expansion Joint Division of the Fluid Sealing Association, 2017 Walnut Street, Philadelphia, Pa. 19103 (2nd Edition), the contents of which are fully incorporated herein by this reference.

It is known that nonmetallic expansion joints are prone to failure from the build-up of abrasive particulates carried by the flue gas stream, which can accumulate in the expansion joint in such quantities that they eventually rupture the pressure seal. Moreover, fly ash and other particulates can cause damage to the expansion joint by solidifying to a cementatious state. Also, certain non-cementatious particulates (fly ash) can create a sever, corrosive (acidic) environment when subjected to cooling (below the $H_2SO_4$ dew point) during a maintenance outage.

To prevent premature expansion joint failure from the build up of particulate matter therein, baffles have been proposed to help direct particulate matter beyond the expansion joint, as shown in FIG. 2. Other proposals include mounting the flexible pressure seal substantially flush with the interior surface of the duct or flue, as shown in FIG. 3, or mounting an insulation barrier behind a baffle arrangement as shown in FIG. 4. Although these proposals may exhibit varying degrees of effectiveness in minimizing expansion joint failure, the arrangement of FIG. 3 may result in thermal transfer on the inner face of the expansion joint and abrasion from particulates in the gas stream. A greater setback would be desirable. The arrangement of FIG. 4 may result in the insulation barrier rubbing on the baffle under negative pressures. Moreover, the insulation barrier must be fixedly attached to both sides of the joint, which may complicate joint construction and also impart adverse loads on the barrier.

To overcome the problems of the prior art, we have developed improved loop seal expansion joint assemblies as set forth in the aforementioned parent applications. While these improvements have gone a long way toward solving many of the problems, they have not all been solved. In spite of the improved seal construction, cyclone inlet and outlet expansion joints fill up with ash and prevent proper movement. Differing expansion rates between combustion outlets, connection cage inlets and the cyclone result in large face to face movement and axial movement of the expansion joints.

Accordingly, there is an evident need for an expansion joint flexible seal assembly which not only prevents particulate build up, but which is durable, easy to install and will perform satisfactorily despite joint movement. It would be further desirable to provide an expansion joint flexible seal assembly that also performs a deflection function to provide an additional sealing barrier to the entry of ash into the seal.

The present invention accomplishes the foregoing objects and advantages. It is therefore an object of the present invention to provide an improved expansion joint seal and flexible shield therefor.

It is a further object of the present invention to provide an expansion joint having a flexible shield that is not adversely affected by relative joint movement.

It is a further object of the present invention to provide an expansion joint having a modular construction for easier installation.

SUMMARY OF THE INVENTION

The present invention employs concepts for an expansion joint and shielded flexible seal therefor that accomplish the foregoing objects and advantages. In accordance therewith, an expansion joint may include flexible seal means having flexible insulating body means and filter means positioned adjacent thereto. Additional filter shield elements are provided, as well as flexible seal mounting means for each installation and joint accessibility. In a further aspect applicable to joints that must accommodate longitudinal offset movements, a baffle system may be provided in combination with shielded filter element means and an air purge system for preventing egress of flue particulates.

BRIEF DESCRIPTION OF THE DRAWINGS

The objects, advantages and features of this invention will be more clearly perceived from the following detailed description when read in accordance with the accompanying in which:

FIG. 6 is a detailed isometric view of a flexible seal constructed in accordance with the present invention having a portion broken away for clarity;

FIG. 7 is a plan view of the flexible seal of FIG. 6 having end portions adapted for interlocking with adjacent flexible seal elements;

FIG. 8 is a detailed cross-sectional view of a shielded nonmetallic expansion joint and flexible seal constructed in accordance with the present invention;

DETAILED DESCRIPTION OF THE PREFERRED EMBODIMENTS

Figure 5:
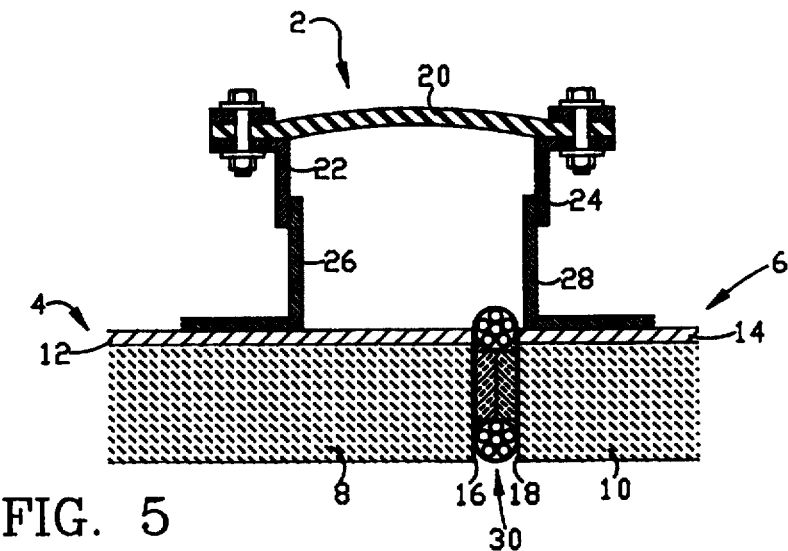
FIG. 5 is a detailed cross-sectional view of a nonmetallic expansion joint and flexible seal constructed in accordance with the present invention.

Referring now to FIG. 5, the invention may be embodied in a structural form in a nonmetallic expansion joint 2 of our prior invention provided between a pair of refractory lined flues 4 and 6. The flues 4 and 6 include respective refractory portions 8 and 10 and metallic outer casings 12 and 14, respectively. the flue sections 4 and 6 terminate at respective peripheral terminal faces 16 and 18 which are positioned to form a gap extending around the periphery of the duct sections. There is also conventionally provided a pressure seal assembly including a flexible pressure seal 20 fastened in conventional fashion to a pair of angle frames 22 and 24 which are in turn mounted to a pair of angle brackets 26 and 28 that are permanently attached by welding or other means to the casings 12 and 14 of the flues 4 and 6. Disposed in the gap formed by the terminal flue faces 16 and 18 is a flexible seal assembly 30, the details of which will now be described.

Turning now to FIG. 6, the flexible seal assembly 30 includes a flexible insulating body 32 made from a ceramic fiber blanket material of suitable density, such as blown or spun alumina silicate material, and a pair of insulating side panels 34 and 36 also made from a ceramic fiber board material of suitable density providing a pair of lateral or side faces adapted for positioning adjacent and parallel to the respective terminal flue faces 16 and 18. The flexible insulating body 32 further includes a pair of end faces 38 and 40 adapted to be positioned generally perpendicularly to the terminal flue faces 16 and 18. The insulating body further includes a longitudinal dimension extending in a direction shown by the arrow A, so as to generally extend along the perimeter of the flue elements 4 and 6.

The flexible seal 30 further includes a pair of filter elements 50 and 52 positioned adjacent to the respective end faces 38 and 40 and extending the longitudinal direction of the insulating body. The filter elements are preferably formed from a wire mesh material arranged in a plurality of wrapping arrangements. Thus, a suitable wire mesh material such as 304SS wire mesh may be rolled into a series of tubes 54 and 56. To form the filter element 50, a plurality of the tubes 54 may be arranged in a bundle, with one of the tubes 54 serving as a central core tube, and wrapped in a larger wire mesh wrapping 58 to complete the filter element 50. Similarly, the filter element 52 can be formed by a plurality of wire mesh tube elements 56 arranged around a central core tube to form a tube bundle, with the bundle being wrapped in a larger wire mesh wrapping 60 to form the filter element 52. Alternatively, the filter elements 50 and 52 could be formed from a pair of solid core flexible hoses. Other filter constructions could also be employed.

Means are provided for securing the filter elements 50 and 52 to the insulating body 32 in the form of a wire mesh wrapping 70 that extends around the filter elements and the insulating body. The wire mesh wrapping may also be 304SS wire mesh. The assembly 30 may be further secured in an exterior flexible casing or wrapping 80 formed from high temperature plastic, or other material. Other wrapping configurations would also no doubt be possible. For example, there may be provided a thin (e.g. one-sixteenth inch) ceramic fiber paper covering under the exterior wrapping 80.

The flexible seal assembly 30 may further be secured with a wire mesh cloth 90 extending between the filer elements 50 and 52, through the insulating core 32. There may be also provided a pair of transverse tie-wires 100 extending through the insulating core 32 and side panels 34 and 36.

The transverse tie wires 100 may be anchored in the external wire mesh wrapping 70.

Turning to FIG. 7, the flexible seal assembly 30 includes end portions 110 and 112 having respective cut-outs 114 and 116 formed therein to provide for interlocking arrangement of successive seal assemblies disposed around the periphery of the flues 4 and 6.

Figure 1:
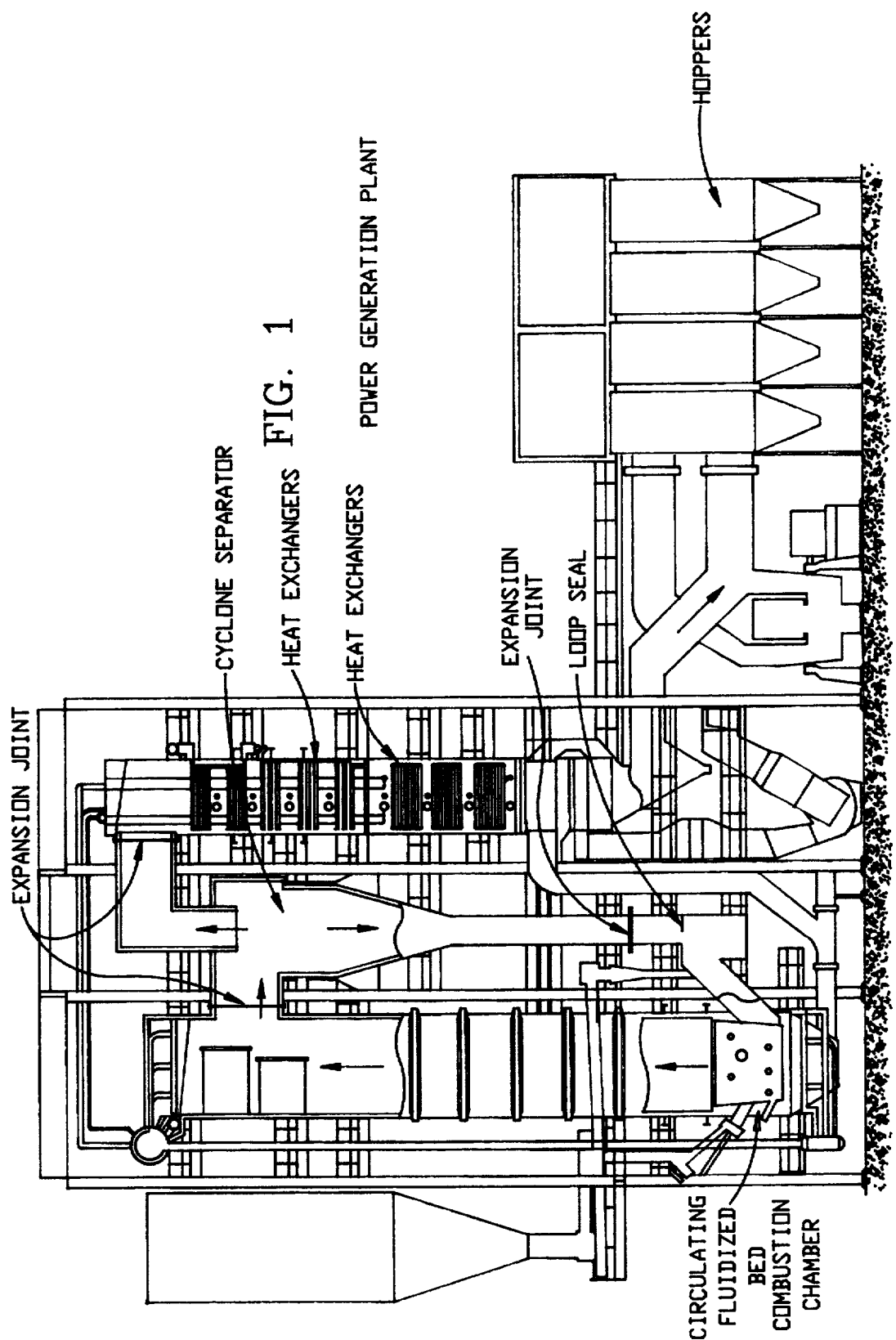
FIG. 1 is a diagrammatic view of a fluidized circulating bed power generation plant that includes expansion joints in the ducting system thereof.
Figure 2:
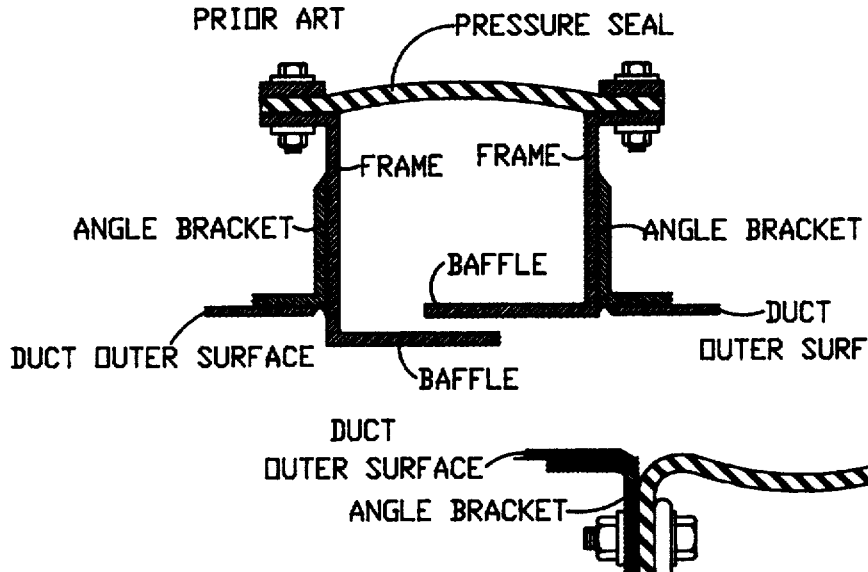
FIG. 2 is a detailed cross-sectional view of a prior art expansion joint having a baffle system to prevent premature joint failure.
Figure 3:
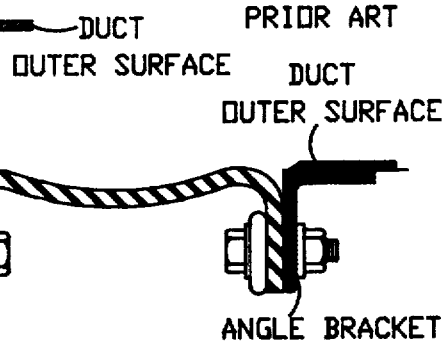
FIG. 3 is a detailed cross-sectional view of another prior art expansion joint having a flush mounted flexible pressure seal also designed to eliminate premature joint failure.
Figure 4:
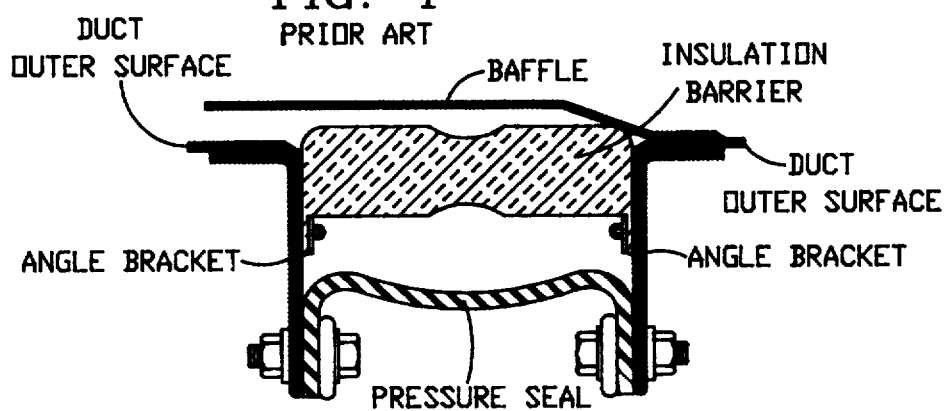
FIG. 4 is a detailed cross-sectional view of still another prior art expansion joint having an insulation barrier and baffle system also designed to minimize premature joint failure.
Figure 9:
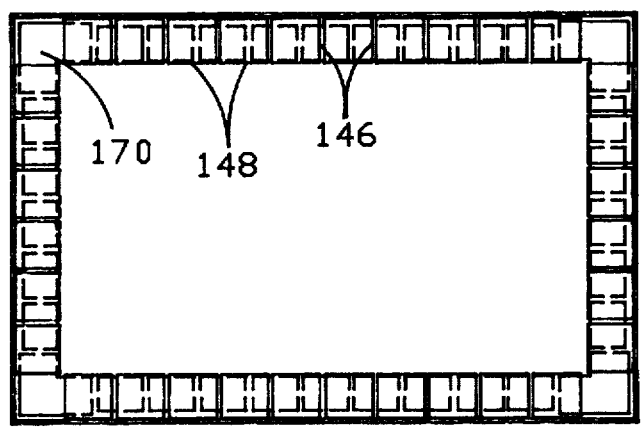
FIG. 9 is a cross-sectional view of a flue section embodying a shielded expansion joint constructed in accordance with the invention.
Figure 10:
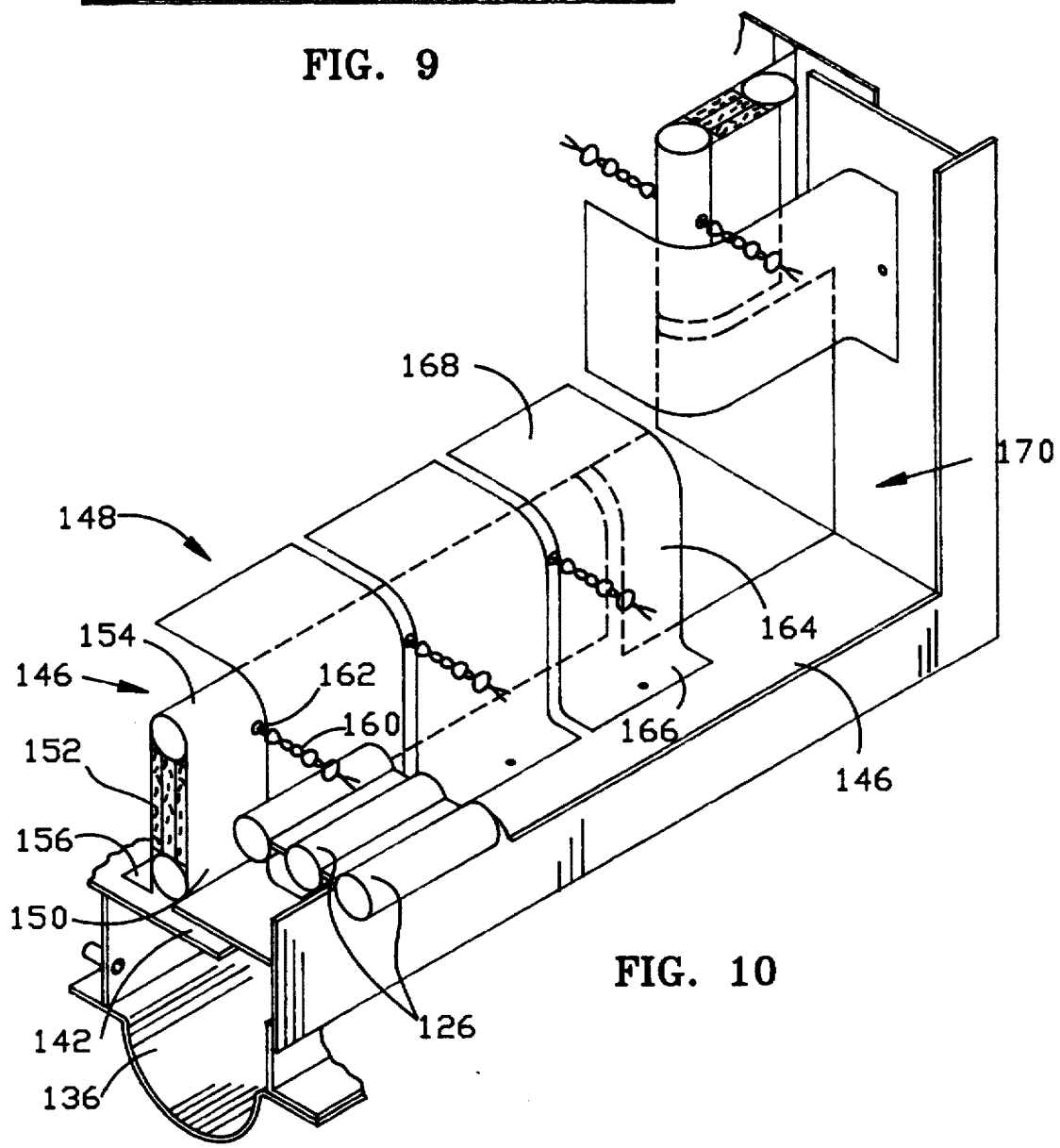
FIG. 10 is a detailed perspective view of a portion of the expansion joint of FIG. 9.

Referring now to FIGS. 8–10, a shielded seal assembly in accordance with the present invention is illustrated in an expansion joint in a rectangular duct or flue assembly between a circulating fluidized bed combustion chamber and a cyclone separator as shown at the top of the assembly of FIG. 1. In this example of the embodiment, a flexible seal 30 is embodied in a shielded seal assembly disposed between or within a joint between an outlet wall section 120 of a flue section from a combustion chamber and an inlet wall 122 of a flue section to a cyclone separator. The flue section 120 is formed of a refractory wall portion 124 with tubes 126 formed in a portion thereof and the wall forming a peripheral abutting end or face 130. The flue section 122 has a refractory wall 132 terminating at a peripheral terminal face 134 which is positioned relative to face 130 to form a gap extending around the periphery of the duct sections. A pressure seal assembly including a pressure seal 136, which is secured by angle brackets 138 and 140 which are attached such as by welding to the flue casings 128 and 142. The pressure seal 136 is connected by suitable conduit 144 to a source of pressurized air or gas. The joint seal assembly comprises a plurality of inner shield members designated generally at 146 and a plurality of outer shield members designated generally at 148.

Referring particularly to FIGS. 8 and 10, the inner shield members comprise a pair of opposed sheet metal panels 150 and 152 joined by a curve semi-cylindrical portion 154 with a foot 156 at one end of one of the panels. This inner shield member is secured by means of the foot 156 to the one flue section wall by extending between the refractory wall portion and the outer metal casing 142. The foot portion may be secured in any suitable manner such as welding, bolting, etc. The inner shield member forms a space between the opposing panels 150 and 152 for receipt of the flexible seal member 30.

The seal members 30 are retained within the inner shield member 146 by means of a wire and rod arrangement with a pair of rods 158 (FIG. 8) extending along spaces within the seal member and secured by wires 160 which wrap around the rods 158 and extend through a pair of opposed one inch holes 162 (FIG. 10) through the wall panels of the inner shield member. The wires 160 extend outward into and are embedded into the refractory wall as it is constructed. The one inch openings provide a slide to enable the shield members to move relative to the wire anchoring members.

As shown in FIGS. 9 and 10, the inner shield members are disposed in multiple end to end units extending around the periphery of the gap in the flue section. The inner shield members are spaced typically about one inch apart when installed for a shield unit having the dimensions of approximately eleven and one-half inches in length and approximately ten and one-half inches in height. The outer shield members designated generally by the numeral 148 (FIG. 10) are formed of a primary sheet metal panel 164 having a foot 166 extending out substantially 90 degrees thereto and an upper or outer shield member 168 extending in the opposite direction from the panel 164 to that of the foot. The foot as in the previous panel discussion is secured to the opposing refractory wall between the space thereof and the outer metal housing 143. The sheet metal for both inner and outer shields is preferably flexible stainless steel of about sixteen (16) gauge.

The shield member extends along the face 130 and to a position where the outer shield portion 150 extends above the inner shield member and in a direction of a gas flow (FIG. 8). Thus, the outer shield member portion 168 extends over and shields the joint from the flowing ash and the like. The outer shield members are positioned to overlap the gaps between the inner shield members. Similarly, the outer shield members are spaced to allow for thermal expansion.

A corner inner shield member 170 is formed of adjoining corner panel members joined by a curved portion. The corner units are not provided with a foot and one of the panel's edge rests on the opening frame 143. Anchoring wires are not provided and extending through the corner shield. However, anchoring wires may be utilized if deemed necessary.

Other modifications and changes are possible in the foregoing disclosure and in some instances, some features may be employed without the corresponding use of other features. Accordingly, while the present invention has been illustrated and described with respect to specific embodiments, it is to be understood that numerous changes and modifications may be made therein without departing from the spirit and scope of the invention as defined in the appended claims.

We claim:

1. An expansion joint protective shield for protectively shielding a seal member disposed in a joint between two flue sections, comprising:

a first shield member formed of sheet metal defining a pair of spaced apart panels connected together by a curved section, one of said panels having means for attachment to an end of a first flue section, said first shield member forming a space between said panels for receiving and protectively shielding a seal member; and a second shield member formed of sheet metal defining a pair of panels connected by a curved portion and extending substantially at a right angle to one another, one of said panels having means for attachment to an end of a second flue section, said second shield member being formed for extending over and overlapping a portion of said first shield member and along extending the direction of gas flow.

2. A protective shield according to claim 1 wherein said first shield member and said second shield member are each constructed of flexible stainless steel.

3. A protective shield according to claim 2 wherein said shield members are about sixteen gauge sheet metal.

4. A protective shield according to claim 3 wherein said first shield member has a generally U-shaped cross section with a pair of legs, said means for attachment being a foot on an end of one of said legs.

5. A protective shield according to claim 4 wherein said second shield member has a generally Z cross sectional configuration with said foot at one end and said curved panel portion at the other.

6. A protective shield according to claim 1 further comprising means for anchoring a seal in said inner shield member within a joint space between a pair of flue sections.

7. A protective shield according to claim 6 wherein said means for anchoring comprises a pair of bars for extending along the length of the seal and a wire attached to said bars and extending through openings in said inner first shield member for attachment to adjacent flue sections.

8. A protective shield according to claim 1 wherein:

said shield members are adapted to be used in multiple units disposed end to end around a joint; and said second shield members are adapted to be positioned over ends of adjacent first shield members.

9. A protective shield according to claim 8 wherein said first shield member has a generally U-shaped cross section with a pair of legs, said means for attachment being a foot on an end of one of said legs.

10. A protective shield according to claim 9 wherein said a second shield member has a generally Z cross sectional configuration with said foot at one end and said curved panel portion at the other.

11. A shielded expansion joint for a flue assembly having a first flue section defined by a peripheral wall terminating at a first end and a second flue section defined by a peripheral wall substantially aligned with said first flue section and terminating at a second end in spaced relation to said first end defining a joint space, comprising:

a seal assembly for mounting in the joint space between spaced ends of said pair of aligned flue sections for sealing said space and allowing relative movement between said ends;

an inner shield assembly comprising an array of first shield members having a foot attached to said first end of said first flue section, said shield members each having a pair of parallel panels joined by a curved portion for extending over and protectively receiving and shielding said seal member; and an outer shield assembly comprising an array of second shield members, each second shield member defined by a central panel portion having a foot for attachment to said second end of said second flue section, said second shield member having an outer panel portion joined by a curved section to said central panel portion and extending at an angle thereto for extending over a portion of said first shield and along the direction of gas flow.

12. An expansion joint according to claim 11 wherein said outer shield members overlap a space between said first shield members.

13. An expansion joint according to claim 12 wherein said inner shield members and said outer shield members are constructed of flexible stainless steel.

14. An expansion joint according to claim 13 wherein said inner shield member has a generally U-shaped cross section with said foot being on an end of one of said panels.

15. An expansion joint according to claim 14 wherein said outer shield member has a generally Z cross sectional configuration with said foot at one end and said outer panel portion at the other end of said central panel portion.

16. An expansion joint according to claim 15 further comprising means for anchoring a seal in said inner shield and said shield within a joint space between a pair of flue sections, said means for anchoring comprises a pair of bars for extending along the length of the seal, and a wire attached to said bars and extending through openings in said inner shield member for attachment to adjacent flue sections.

17. A shielded expansion joint for a flue, comprising:

a first flue section defined by a peripheral wall terminating at a first end;

a second flue section defined by a peripheral wall substantially aligned with said first flue section and terminating at a second end in spaced relation to said first end defining a joint space;

a seal assembly for mounting in said joint space between spaced ends of said pair of aligned flue sections for sealing said space and allowing relative movement between said ends;

an inner shield assembly comprising an array of first shield members having a foot attached to said first end of said first flue section, said first shield members each formed of about sixteen gauge stainless steel sheets having a pair of parallel panels joined by curved portion for extending over and protectively receiving and shielding said seal member; and an outer shield assembly comprising an array of second shield members, each second shield member defined by a central panel portion having a foot for attachment to said second end of said second flue section, said second shield member each formed of about sixteen gauge stainless steel sheets having an outer panel portion joined by a curved section to said central panel portion an extending at an angle thereto for extending over a portion of said first shield and along the direction of gas flow.

18. An expansion joint according to claim 17 further comprising means for anchoring said seal in said inner shield and said shield within said joint space between a pair of flue sections, said means for anchoring comprises a pair of bars for extending along the length of the seal, and a wire attached to said bars and extending through openings in said inner shield member for attachment to adjacent flue sections.

19. An expansion joint according to claim 18 wherein said flue sections are generally rectangular in cross-section.

\* \* \* \* \*

UNITED STATES PATENT AND TRADEMARK OFFICE
CERTIFICATE OF CORRECTION

PATENT NO. : 5,560,166
DATED : October 1, 1996
INVENTOR(S) : Burke et al.

It is certified that error appears in the above-indentified patent and that said Letters Patent is hereby corrected as shown below:

Column 6, line 45 "along extending" should be "extending along"

Signed and Sealed this

Tenth Day of December, 1996

Attest:

BRUCE LEHMAN

*Attesting Officer*

*Commissioner of Patents and Trademarks*